Dec. 6, 1960 G. O. BUCKNER, JR 2,963,640
WELL BORE RESISTIVITY SCANNING SYSTEM
Filed March 4, 1957 3 Sheets-Sheet 1

INVENTOR.
GUY O. BUCKNER JR.,
BY
James M. Leffers
AGENT.

Dec. 6, 1960     G. O. BUCKNER, JR     2,963,640
WELL BORE RESISTIVITY SCANNING SYSTEM
Filed March 4, 1957     3 Sheets-Sheet 2

INVENTOR.
GUY O. BUCKNER JR.,
BY James M. Peppers
AGENT.

INVENTOR.
GUY O. BUCKNER JR.,
BY
AGENT.

United States Patent Office 2,963,640
Patented Dec. 6, 1960

2,963,640

WELL BORE RESISTIVITY SCANNING SYSTEM

Guy O. Buckner, Jr., Houston, Tex., assignor, by mesne assignments, to Welex, Inc., a corporation of Delaware Filed Mar. 4, 1957, Ser. No. 643,669

9 Claims. (Cl. 324—1)

This invention generally relates to apparatus for measuring the apparent electrical resistivity of well formations and more particularly relates to improved apparatus for accurately measuring and indicating the apparent resistivity of successive radially spaced increments of formation about a well bore.

Resistivity logging of well formations by means of selectively spaced electrodes is commonly known and widely used. In such systems the penetration of measurement, i.e., the radial zones of the formation effecting such measurement, depends on the spacing of the electrodes. Frequent use is made of a three electrode resistivity measuring system, the measurement of which is sometimes called and herein referred to as a "lateral" log. Such systems employ the use of a current electrode having a remote return and one to several pairs of potential electrodes selectively spaced therefrom or, alternately, employ the use of two closely spaced current electrodes, one to several selectively spaced potential electrodes, and a remotely spaced reference potential electrode. In either system the closely spaced pair of electrodes define the thickness of a spherical shell of influence, the radius of which is the spacing to the single electrode. Generally, two or more of these lateral measurements at different electrode spacing are recorded simultaneously, each then being representative of different radially spaced zones of influence.

For convenience and simplicity in attaining the continuous interpolation and electrode spacing compensation improvements of the present invention, as well as other improvements evident from the following description, the apparatus of the present invention employs two closely spaced current electrodes, a plurality of selectively spaced potential electrodes, and a remotely spaced reference potential electrode.

This invention is an improvement over the presently accepted procedure of recording two or more differently spaced lateral logs simultaneously in that an infinite variation of measurement is effected of a formation at a specific depth for a large radial range of formation influence. Additionally, this invention is an improvement over present devices for producing this type of indication in that discrete selected points in formation depth are indicated; the points measured of radial zones of apparent resistivity are accurately indicated and the zones between the points of such measurement are accurately interpolated; the complete interpolated potential is continuously compensated in response to spacing variation of the potential electrodes; the potential points are swiftly measured, interpolated and compensated in each discrete scanning cycle; a synchronizing and calibrating means provides an accurate and constant amplitude range for each cycle of said scanned potential; and the said potential is adapted to be transmitted from thousands of feet in a well bore by a single transmission means over a single conductor logging cable.

To obtain apparent resistivity logs of radially spaced zones of a well formation at a particular depth, the most predominate present practice is to continuously record a large number of these lateral measurements at different spacings and then manually plot the herein illustrated logs from the points recorded at a particular depth. Not only has this been arduous and susceptible of error, but such plotted logs are only point graphs and any interpolation made between such points must be at the discretion of the plotter.

Apparatus has been devised to successively record a plurality of potentials found at varied electrode spacings. An example of such apparatus is disclosed in Patent No. 2,754,475 to Norelius. The interpretative value of logs recorded by apparatus of this type is a direct function of their accuracy and at best may be difficult to interpret. These past devices essentially have recorded the points available by manual plotting or, if they were recorded as a smooth curve, did so in an averaging manner rather than in an interpolating manner. Thus, exact accuracy at the points of potential measurement is sacrificed to smooth the curve of the potential between such points. Such devices also have the disadvantage that the potential points are scanned rather slowly and require the logging tool to be relatively immobile during each scanning cycle to prevent the distortion due to tool movement past changing formation. Further, such devices have no means of holding the scanned signal to a constant range.

Accordingly, an object of this invention is to provide apparatus for obtaining an electrical indication of the apparent resistivity of successive radially spaced increments of a well formation.

Another object of this invention is to provide discretely actuated continuous scanning means for selective indication at selected well depths.

Another object of this invention is to provide interpolating means to interpolate such indication at all points between said scanning points to provide a continuously accurate indication.

Another object of this invention is to provide means to continuously compensate said indication for potential variation effected by potential electrode spacing.

A further object of this invention is to provide a synchronizing and calibrating means to adjust said indication means for accurate and constant range of scanned indication.

Other objects and advantages will become evident hereinafter.

This invention provides apparatus having two closely spaced current electrodes, a plurality of selectively spaced potential electrodes, and a remotely spaced potential reference electrode. Means are provided to scan the potential found at each potential electrode and produce a continuous discrete signal of the value at each scanned potential electrode and of interpolated value of the potential occurring between each scanned electrode. Said interpolation may be made in accordance with the potential gradient occurring along the spacing of said electrodes in a homogeneous medium. A synchronizing and calibrating signal means is provided to introduce and provide relative calibration for said potential signal. Continuous compensating calibration means is provided to vary said potential signal in accordance with the apparent resistivity which varies as a function of the potential electrode spacing. Single signal transmission means is provided to transmit said potential signal and said calibration signal to an indicating and recording means. Means are provided to actuate said scanning means through one continuous scanning cycle at preselected intervals. When desired, means of determining a correlative potential is provided and may be indicated concurrently with said scanned signal.

Other objects and advantages provided by the invention will become more apparent from the following description considered in reference to the accompanying drawing in which:

Figure 1 generally illustrates the well logging apparatus when suspended in a well bore and the predominate zones of influence of the adjacent formation which affect the potential measured by the apparatus.

Figures 1, 2:
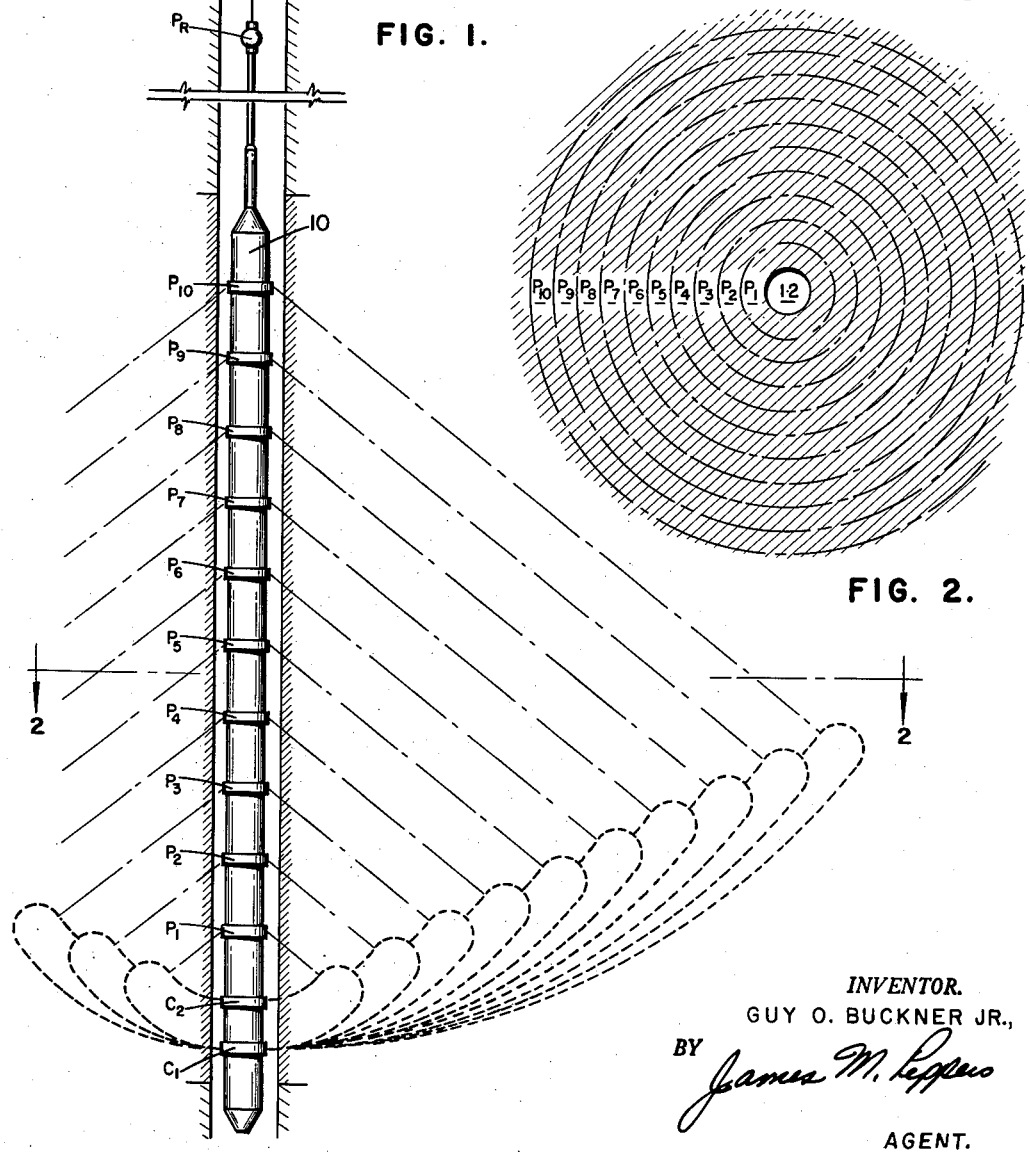
Figure 2 is a plan view of a section of the formation about a well bore also illustrating the predominate zones of influence affecting the potential measurement.

Now, referring to Figure 1, there is shown a logging tool 10 suspended from a logging cable 14 for vertical movement in a well bore 12. A hoisting reel 16 is provided to raise and lower tool 10 in the well bore. Shown on tool 10 is a current electrode $C_1$ positioned in spaced relation to a current electrode $C_2$. Also provided along tool 10 in spaced relation to current electrodes $C_1$ and $C_2$, and in spaced relation one to another, are a multiplicity of potential electrodes, herein exampled as $P_1$ through $P_{10}$. Remotely supported from potential electrodes $P_1$ through $P_{10}$ on cable 14 is a reference potential electrode $P_R$.

Tool 10 has electrical connection through a slip ring of reel 16 to later described sources of power, and to an indicating and recording means 18, shown in greater detail in Figure 3. A means to drive recorder 18 in synchronous relation to the travel of logging tool 10 is provided in mechanical connection to reel 16, exampled as a "Selsyn" transmitter 20.

Indicated by dashed lines in Figures 1 and 2 are the most predominate zones of influence affecting the potential measurement at each potential electrode $P_1$ through $P_{10}$. These zones, oriented with successively spaced potential electrodes by dashed lines, each radially extend into the formation about well bore 12 in the form of a circular segment of a spherical shell. It is pointed out that the zones as illustrated define only the most predominant portion of such shells of influence, it being obvious that the remainder of each spherical shell and the formation adjacent to such shell will also be influential to some extent. Also obvious, however, is that if the entire shell were of equal influence, that the logging tool, in some cases, particularly upon wide spacing of said potential electrodes, could indicate formations of relatively thin horizontal bed thicknesses twice upon a single traversal of tool 10.

Figure 3:
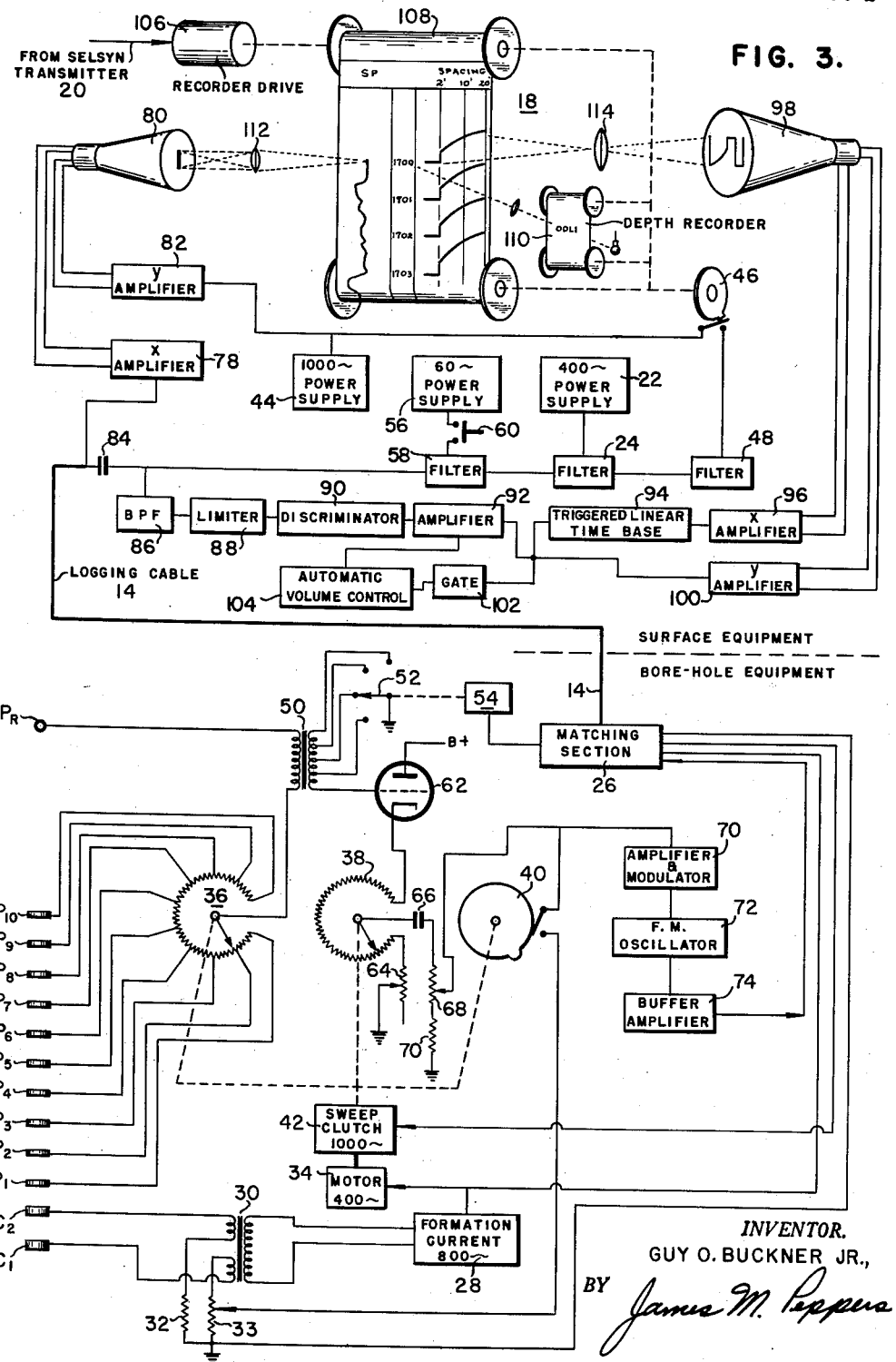
Figure 3 is a schematic representation of the system provided by this invention, the lower portion illustrating the detection and transmission means provided in the the logging tool, and the upper portion representing the receiving and recording means provided at the earth's surface.

Now referring to Figure 3, there is shown, in schematic representation, the circuit provided by the present invention. A power supply 22, herein exampled as 400 cycles, is impressed on logging cable 14 through a filter 24 to provide power to tool 10 through a matching section 26. A formation current power supply 28, illustrated as 800 cycles, provides current to current electrodes $C_1$ and $C_2$ through a transformer 30. To reduce capacitive coupling, i.e., noise, each of current electrodes $C_1$ and $C_2$ is connected through separate secondaries of transformer 30 to ground. The current of electrode $C_1$ is selected by a resistance 33 which, as later described, also serves as a potentiometer. The current of electrode $C_2$ is selected by a resistor 32.

Figures 4, 5, 6, 7, 8, 9:
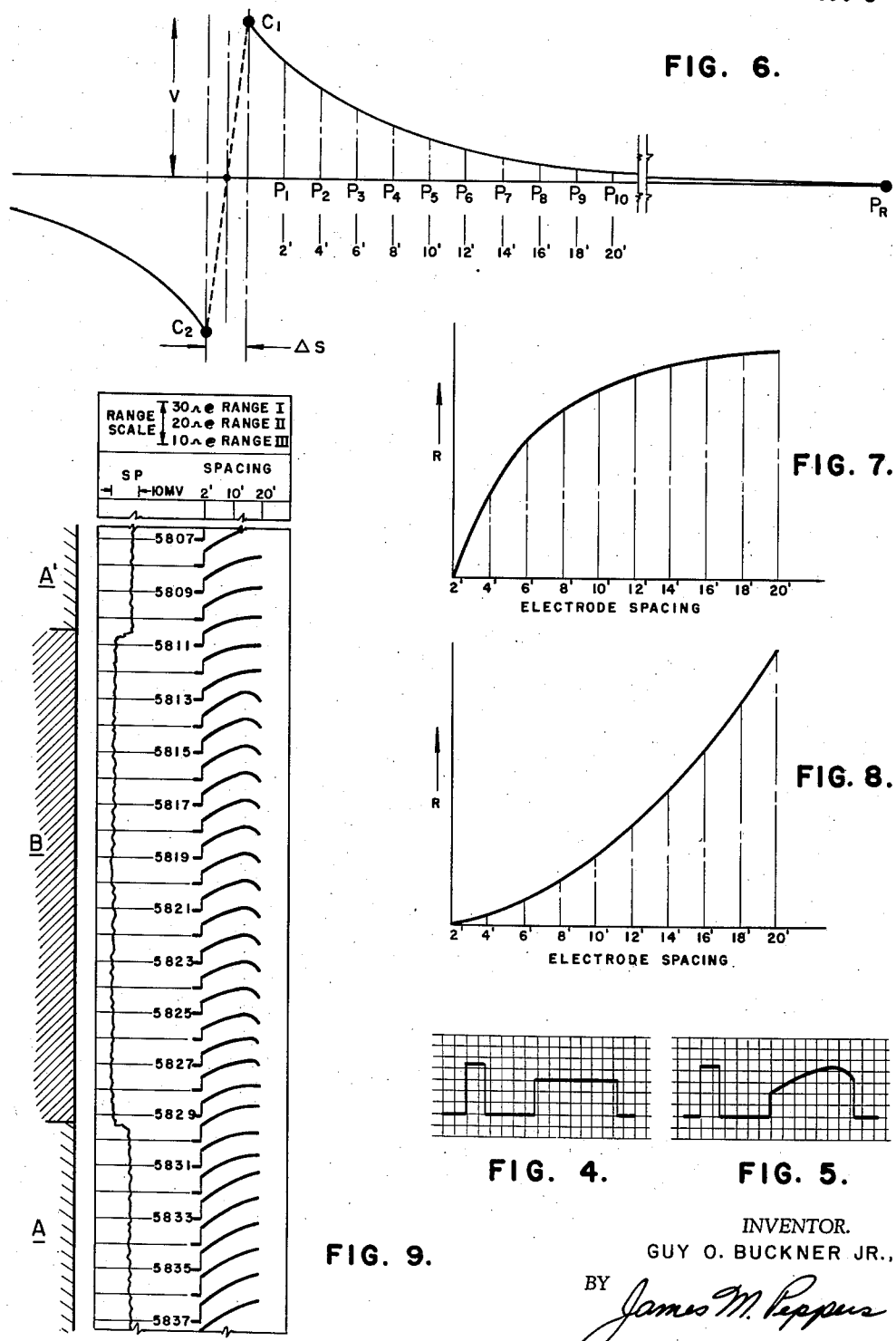
Figure 4 is a curve representing the transmitted signal of detected apparent resistivity when the logging tool is immersed in an electrically homogeneous medium.
Figure 5 is a curve representing the transmitted signal of the detected resistivity when the logging tool is in a conductive bore hole through a formation which has progressively greater resistivity away from said hole.
Figure 6 is a curve illustrating the potential created by the current electrodes plotted against the axis of the logging tool.
Figure 7 is a curve illustrating the cumulative resistance of an interpolating potentiometer plotted against the spacing of the potential electrodes and indicating the terminal connections of said electrodes thereto.
Figure 8 is a curve illustrating the cumulative resistance of a compensating calibration potentiometer plotted against the spacing of said potential electrodes and indicating the compensating resistance for adjustment of the potential detected at and between each electrode.
Figure 9 is a well logging chart illustrating the resistivities recorded of well formations at various depths.

Upon immersion of logging tool 10 in an electrically homogeneous medium, current through electrodes $C_1$ and $C_2$ will create a potential field along the axis of tool 10 which, when plotted against distance along said axis, will create a potential gradient generally illustrated in Figure 6. The potentials found between each of potential electrodes $P_1$ through $P_{10}$ and reference potential electrode $P_R$ will be found to vary in response to relative spacing as illustrated.

When in a homogeneous medium the potential field gradient illustrated will conform the following formula.

$$V = \pm \frac{\rho I \Delta s}{4\pi s^2}$$

where:

$V$ is the potential,
$\rho$ is a resistivity of the medium,
$I$ is the current flowing, and
$s$ is the electrode spacing.

Each of potential electrodes $P_1$ through $P_{10}$ is connected to a high value interpolating potentiometer 36 at equal positions. The tap of potentiometer 36 is connected to reference potential electrode $P_R$ through the primary winding of a transformer 50. When connected as illustrated, the tap of potentiometer 36 may be rotated over the length of said potentiometer and detect the potentials found at potential electrodes $P_1$ through $P_{10}$. As the tap traverses portions of the potentiometer 36 intermediate the connections of the potential electrodes, the potential detected will be responsive to the resistance between said electrodes. Thus, if the potentiometer were linear, the potential found between any two electrode connections would be linearly interpolated. Preferably, however, potentiometer 36 is provided with a change in resistance corresponding to the potential curve illustrated in Figure 6. A curve representing the cumulative resistance plotted against the tap position of such a potentiometer is illustrated in Figure 7. As seen in Figure 7, the resistance R varies with potential electrode spacing, e.g., potentiometer tap position.

Thus, each time the potentiometer 36 tap is rotated through one complete revolution, the actual potentials found at electrodes $P_1$ through $P_{10}$ and the interpolated potentials occurring between said electrodes will be impressed on the primary of transformer 50.

A constant speed motor 34, powered by the 400 cycle current provided to tool 10, is adapted to drive interpolation potentiometer 36 through an intermittently actuated sweep clutch 42. As provided, clutch 42 will rotate potentiometer 36 at a constant speed through one complete revolution upon being energized by a current of different frequency than said power current, for example 1000 cycles. Such 1000 cycle current is provided to clutch 42 from a 1000 cycle power supply 44 found at the earth's surface. This 1000 cycle current is transmitted through an actuating cam switch 46, a filter 48, logging cable 14, and matching section 26. As later described, each closure of switch 46 will engage clutch 42. Thus, one complete revolution of potentiometer 36 and one complete scanning cycle of the potentials at $P_1$ through $P_{10}$ are provided.

Also driven by motor 34 through clutch 42 is a compensating calibration potentiometer 38, later described, and a cam switch 40. As illustrated, each actuation of clutch 42 will synchronously drive potentiometer 36, potentiometer 38 and switch 40 through one complete cycle.

Voltage induced in the secondary of transformer 50 by the voltage appearing in the primary thereof is impressed on the grid of a triode 62. The plate of triode 62 is connected to a conventional B+ source (not shown). The cathode of triode 62 is connected through compensating potentiometer 38 and a variable balancing resistor 64 to ground.

Potentiometer 38 is provided to continuously compensate for the potential magnitude detected at electrodes $P_1$ through $P_{10}$ in accordance to their spacing. As is known, and illustrated by Figure 6, the relative potentials found at each potential electrode vary as a function of its spacing from current electrodes $C_1$ and $C_2$. Thus, for exact compensation, potentiometer 38 is provided with varied cumulative resistance the value of which, when plotted against electrode spacing, is illustrated in Figure 8. When so provided, such compensation is both continuous and exact upon each scanning cycle of potentiometer 38. Variable resistor 64 is provided to adjust the sensitivity of potentiometer 38 at the short spaced electrode $P_1$.

The tap of potentiometer 38 is connected through a capacitor 66, a potentiometer 68, and a resistor 70 to ground. The tap position of potentiometer 68 is provided for adjustment of the sensitivity at the long spaced electrode $P_{10}$. Transformer 50 is connected through a contact of a range switch 52 to ground. A solenoid 54, provided to be actuated from the earth's surface by a third source of power, herein exampled as 60 cycles, receives such power through a 60 cycle power source 56, a stepping switch 60, filter 58, logging cable 14 and matching section 26. When so provided, the output of transformer 50 may be selectively varied by successive closure of stepping switch 60.

The tap of potentiometer 68 is connected into an FM signal transmission system for transmission of the detected potential to the earth's surface. This system consists of an amplifier and modulator 70 connected into an FM oscillator 72. The tap of potentiometer 33 is also connected into amplifier and modulator 70 through cam switch 40. FM oscillator 72 is connected through a buffer amplifier 74, matching section 26, logging cable 14, to the surface of the ground. The center frequency of oscillator 72 may be of any frequency convenient for FM transmission, 22.5 kc. being an example.

The angular position of potentiometer 36 tap, potentiometer 38 tap, and the cam switch 40 is such that, through one rotation, the switch 40 is momentarily closed, introducing a voltage into modulator 70 from potentiometer 33. A succeeding scanned potential voltage is introduced from the potentiometer 68 which has been received from transformer 50. Thus, the voltage appearing at modulator 70 during one revolution of clutch 42 will have a potential profile generally illustrated in Figures 4 and 5.

The curve in Figure 4 generally illustrates the potential detected at electrodes $P_1$ through $P_{10}$ when a properly calibrated tool 10 is immersed in an electrically homogeneous medium. Figure 5 generally illustrates the potential detected at electrodes $P_1$ through $P_{10}$ when tool 10 is suspended in a well bore containing conductive fluids and traversing a resistive formation.

It is seen, from reference to the potential curve illustrated in Figure 6, and to the connection of the center tap of the secondary of transformer 30, that the junction of resistor 32 and potentiometer 33 will exhibit a zero potential with respect to the current flowing between current electrodes $C_1$ and $C_2$. It is therefore seen that any potential detected at this midpoint would be due to factors outside the illustrated system. Measure may therefore be conveniently made of the spontaneous potential from this point. Referring to Figure 3, connection is made at the junction of resistor 32 and potentiometer 33 through a D.C. connection in matching section 26 for subsequent detection of the spontaneous potential at the earth's surface.

It is now seen that two signals will be found on the conductor of cable 14 at the earth's surface. One of such signals is the 22.5 kc. FM signal emanating from oscillator 72 in response to the previously described sequence of voltages into modulator 70. The other of such signals will be the D.C. spontaneous potential detected at the connection of resistor 32 and potentiometer 33.

The D.C. spontaneous potential signal is received at the horizontal deflection amplifier 78 of an oscilloscope 80 by direct connection to the conductor of cable 14. The y amplifier 82 of oscilloscope 80 is powered by 1000 cycle supply 44 and supplies only sufficient amplification to thicken the point of fluorescence on the face of said scope. The horizontally traversing point trace of oscilloscope 80 is then projected through a lens system 112 to a logging chart 108.

Also connected to the logging cable 14 through a capacitor 84 is an FM signal discrimination means consisting of a band pass filter 86, a limiter 88 and a discriminator 90. For further description of frequency modulated transmission means incorporated into electric logging systems, reference may be had to Patent No. 2,573,133 to Greer.

The output of discriminator 90 is connected through a variable gain amplifier 92. The output of amplifier 92 feeds into a sawtooth time base generator 94 and also to the y amplifier of an oscilloscope 98. The output of generator 94 feeds into the x amplifier 96 of oscilloscope 98.

The output of amplifier 92 also feeds into a feedback control means consisting of a gating circuit 102 and an automatic volume control 104. The output of volume control 104 controls the gain of amplifier 92. The gating circuit 102 is provided to pass only that synchronizing and calibration portion of the received signal and to exclude that portion of the scanned potential signal emanating from potentiometer 68. It is thus seen that the output of amplifier 92 will always be directly responsive to the amplitude of the signal from cam switch 40 and the trace appearing on oscilloscope 98 will always be of constant amplitude range.

It is now seen that a signal, as illustrated in Figures 4 and 5, will appear on the face of oscilloscope 98 upon each closing of cam switch 46 and will be of constant vertical range as established by the voltage from cam switch 40.

In response to rotation of hoisting reel 16, transmitter 20 drives a receiver 106. Receiver 106 is mechanically connected to recorder 18 which includes a depth recording means 110 and cam switch 46. When so provided, the logging chart 108 moves in definite proportion to the vertical travel of logging tool 10. Depth recorder 110 projects appropriate depth numbers on the logging chart in response to the depth of tool 10 in the well bore. As illustrated, the spontaneous potential is projected on the left side of the logging chart through lens system 112.

A lens and shutter assembly 114 is provided to project each trace occurring on oscilloscope 98 to logging chart 108. Thus, upon travel of logging tool 10, there will be a scanned potential trace recorded on the right of logging chart 108, such as illustrated in Figure 5, upon each closing of cam switch 46. The calibration portion of the potential trace need not be recorded.

The logging chart will thus have recorded thereon a continuous trace of the spontaneous potential, the corresponding depth of logging tool 10, and individual traces of the signals transmitted to the earth's surface from the output of transformer 50. The number of signals thus projected may be varied as desired. As herein exampled, the arrangement is such that one trace is recorded for each one foot of tool travel.

It is pointed out that switch 46 may be actuated by other means than in response to tool depth to provide each projected potential trace on logging chart 108. For example, switch 46 could be operated on a time interval basis and the tool travel be selected to give the desired number of traces per unit travel in well bore 12. Or, for close scrutiny of a particular section of well formation, the tool 10 could be moved very slowly past said formation and the switch 46 be manually actuated as many times as desired.

In operation, tool 10 is usually lowered to the bottom of well bore 12; then continuously raised at a relatively constant speed. A log of the apparent resistivities of various depths of well formation is then made while the tool is in transit. As the tool progresses upwardly, receiver 106 drives the logging chart 108 at a rate proportional to tool displacement. The spontaneous potential is continuously recorded on the logging chart by oscilloscope 80 through lens 112. At each foot of tool travel, cam switch 46 closes, swifty sweeping potentiometer 36 through one complete cycle and scanning the potential at electrodes $P_1$ through $P_{10}$. This scanned and interpolated potential is then impressed through potentiometers 38 and 68 to modulator 70. Cam switch 40 has preceeded this scanned potential with a constant synchronizing and calibrating potential of predetermined amplitude. Modulator 70 then modulates oscillator 72 in response to the calibration and the scanned potentials. At the earth's surface the calibration and the scanned potentials are discriminated and amplified by amplifier 92 to a constant range determined by the amplitude of the calibration potential. The scanned potential is then projected on the logging chart by oscilloscope 98 through lens and shutter 114. The depth of tool 10 is concurrently recorded by depth recorder 110. If the tool 10 is logging zones having little difference in apparent resistivity, the scanned potential range may be expanded by actuating stepping switch 60 to switch range switch 52.

As illustrated in Figure 7, interpolating potentiometer 36 is provided of varied resistance plotted against electrode spacing to produce a predetermined resistance variation in relation to successive increments of its tap. It is pointed out that a major advantage of this provision is that an accurate measure of the potential at each of the electrodes $P_1$ through $P_{10}$ is made when the tap of potentiometer 36 encounters its connection and that the potential encountered between each potential electrode is accurately interpolated in accordance with the potential gradient illustrated in Figure 6.

Compensation calibration potentiometer 38 is also provided of varied resistance in order to produce continuously varying cumulative increments of resistance at successive positions of its tap. As illustrated in Figure 8, this resistance variation is directly responsive to the illustrated change in potential occurring along the axis of tool 10.

Figure 9 generally illustrates a completed logging chart of a particular section of well formation wherein tool 100 has successively traveled upwardly through a first formation designated by A, having high resistivity and little mud filtrate invasion. Designated at B is a formation of lower resistivity and having considerable mud filtrate invasion. Designated at A' is a formation similar in nature to that of A. As can be seen, the correlating spontaneous potential varies with each formation encountered. It is also seen that the scanned apparent resistivity curves occurring on the right vary in profile with the nature of the formation encountered.

It is pointed out that the potential electrode spacing, herein exampled as two feet, could be extensively varied from only a few inches to several feet depending on the lateral range of influential formation desired. For very close electrode spacing, the shunting effects of conductive fluids in the well bore become very predominant and tend to mask any apparent resistivity variation of the adjacent formation.

With tool 10 provided as illustrated in Figure 1 it has been found that the masking effects of such conductive well bore fluids prevent any appreciable delineation of the detected apparent resistivity for electrodes closer than the herein exampled two feet. It is seen that the apparent resistivity curves obtained by the tool as embodied in Figure 1 are similar to those presented in the paper by H. Guyod entitled, Electrical Logging Developments in the U.S.S.R., Part 3, World Oil, 1948, and must be interpreted in the same manner. Hence it is seen that the recorded apparent resistivities are an interpretative device at best and that the accuracy provided by the present invention lends appreciable aid to such interpretation.

While the invention has been described in connection with a present preferred embodiment, it is to be understood that the description is not intended to limit the invention, the scope of which is defined by the appended claims.

That being claimed is:

1. In a well formation resistivity logging system having means including current electrodes for producing a potential field at variable depths within a well bore and a plurality of potential electrodes fixedly disposed in spaced relation within said potential field, the combination of; interpolation means adapted for continuous scanning cycles in sequential connection with said potential electrodes for detecting the potentials occurring at each potential electrode and for interpolating the potentials occurring intermediate each electrode in response to a preselected interpolation function to exhibit a continuous potential signal through a complete scanning cycle; a variable compensating means adapted for continuous scanning cycles in connection with said interpolation means for continuously compensating said potential signal in response to the potential field gradient occurring through said electrode spacing; a selectively actuated scanning means in connection with said interpolation means and said compensating means for concurrently sweeping said interpolation means and said compensating means through a continuous scanning cycle; frequency modulated signal transmission means in connection with said compensating means for transmitting the compensated potential signal; a synchronized scaling means, including switching means in connection with said current electrodes and said scanning means, in connection with said transmission means for scaling the potential signal in response to the magnitude of said potential field; and indicating and recording means in connection with said transmission means for separately indicating and recording each potential signal in relation to the well formation depth at which said signal was detected.

2. In a well formation resistivity logging system having means including current electrodes for producing a potential field at variable depths within a well bore and a plurality of potential electrodes fixedly disposed in spaced relation within said potential field, the combination of; interpolation means adapted for continuous scanning cycles in sequential connection with said potential electrodes for detecting the potentials occurring at each potential electrode spacing and interpolating the potentials occurring intermediate each electrode spacing in response to a preselected interpolation function to exhibit a continuous potential signal through each of said scanning cycles; a variable compensating means adapted for continuous scanning cycles in connection with said interpolation means for continuously compensating said potential signal in response to the potential field gradient occurring through said electrode spacing; a selectively actuated scanning means in connection with said interpolation means and said compensating means for concurrently sweeping said interpolation means and said compensating means through a continuous scanning cycle; signal transmission means in connection with said compensating means for transmitting said potential signal; scaling means, including switching means in connection with said current electrode and in synchronized connection with said scanning means, in connection with said transmission means for scaling the potential signal in relation to the magnitude of said potential field; and indicating and recording means in connection with said transmission means for separately indicating and recording each potential signal in relation to the well depth at which said signal was detected.

3. In a well formation resistivity logging system having means including current electrodes for producing a potential field at variable depths within a well bore and having a plurality of potential electrodes fixedly disposed in spaced relation within said potential field, the combination of; interpolation means adapted for continuous scanning cycles in sequential connection with said potential electrodes for detecting the potentials occurring at each potential electrode spacing and interpolating the potentials occurring intermediate each electrode spacing in response to a preselected interpolation function to exhibit a continuous potential signal through each of said scanning cycles; a variable potential compensating means adapted for continuous scanning cycles in connection with said interpolation means for continuously compensating said potential signal in relation to the potential field gradient occurring through said electrode spacing; frequency modulated signal transmission means in connection with said compensating means for transmitting said potential signal; a synchronized scaling means, including switching means in connection with said current electrode and said scanning means, in connection with said transmission means for scaling the potential signal in response to the magnitude of said potential field; and indicating means in connection with said transmission means for separately indicating each potential signal in relation to the well depth at which said signal was detected.

4. In a well formation resistivity logging system having means including current electrodes for producing a potential field at variable depths within a well bore and a plurality of potential electrodes fixedly disposed in spaced relation within said potential field, the combination of; interpolation means adapted for continuous scanning cycles in sequential connection with said potential electrodes for detecting the potentials occurring at each potential electrode spacing and interpolating the potentials occurring intermediate each electrode spacing in relation to a preselected interpolation function to exhibit a continuous potential signal through each complete scanning cycle; a selectively actuated scanning means in driving connection with said interpolation means for sweeping said interpolation means through a continuous scanning cycle; signal transmission means in connection with said interpolation means for transmitting said potential signal; a synchronized scaling means, in connection with said current electrodes, said scanning means, and said transmission means for scaling the potential signal in response to the magnitude of said potential field; and indicating means in connection with said transmission means for separately indicating each potential signal in relation to the well depth at which said signal was detected.

5. A well formation resistivity logging system having means including current electrodes for producing a potential field at variable depths within a well bore, a plurality of potential electrodes fixedly disposed in spaced relation within said potential field, and means for separately indicating a potential signal in relation to the well depth at which said potential field is disposed, comprising; an interpolation potentiometer adapted for continuous scanning cycles and provided of incremental resistivity related to a preselected interpolation function in connection with said potential electrodes for sequentially detecting the potentials occurring at each potential electrode and for interpolating the potentials occurring intermediate each electrode in response to said detected potentials and in relation to said interpolation function to exhibit a continuous potential signal through each of said scanning cycles; a variable compensating potentiometer adapted for continuous scanning cycles and provided of incremental resistivity related to the potential field gradient occurring through the spacing of said potential electrodes in connection with the tap of said interpolation potentiometer for continuously compensating said potential signal in relation to said potential gradient; a selectively actuated scanning means including a constant velocity driving means in connection with said interpolation potentiometer and said calibration potentiometer for selectively sweeping said potentiometers through a continuous scanning cycle; and frequency modulated signal transmission means in connection with the tap of said compensating potentiometer for transmitting said potential signal to said indicating means.

6. A well formation resistivity logging system having means including current electrodes for producing a potential field at variable depths within a well bore, a plurality of potential electrodes fixedly disposed in spaced relation within said potential field and indicating means for separately indicating a potential signal in relation to the well depth at which said potential field is disposed comprising; an interpolation potentiometer adapted for continuous scanning cycles and provided of preselected incremental resistivity in connection with said potential electrodes for sequentially detecting the potentials occurring at each potential electrode and interpolating the potentials occurring intermediate each spacing in response to said detected potentials to exhibit a continuous potential signal through each of said scanning cycles; a variable compensating potentiometer adapted for continuous scanning cycles and provided of incremental resistivity related to the potential field gradient occurring through the spacing of said potential electrodes in connection with the tap of said interpolation potentiometer for continuously compensating said potential signal in response to said potential gradient; a selectively actuated scanning means including a constant velocity driving means in connection with said interpolation potentiometer and said calibration potentiometer for selectively sweeping said potentiometers through a continuous scanning cycle; and signal transmission means in connection with said calibration potentiometer for transmitting said potential signal to said indicating means.

7. A well formation resistivity logging system having means including current electrodes for producing a potential field at variable depths within a well bore, a plurality of potential electrodes fixedly disposed in spaced relation within said potential field, and indicating means for separately indicating a potential signal in relation to the well depth at which said potential field is disposed, comprising; an interpolation potentiometer adapted for continuous scanning cycles and provided of incremental resistivity related to a preselected interpolation function in connection with said potential electrodes for sequentially detecting the potentials occurring at each potential electrode spacing and interpolating the potentials occurring intermediate each spacing in response to said detected potentials and in relation to said interpolation function to exhibit a continuous potential signal through each of said scanning cycles; a variable compensating potentiometer adapted for continuous scanning cycles and provided of incremental resistivity related to the potential field gradient occurring through the spacing of said potential electrode in connection with the tap of said interpolation potentiometer for continuously compensating said potential signal in response to said potential gradient; signal transmission means in connection with said calibration potentiometer for transmitting said potential signal to said indicating means; and a synchronized scaling means, including switching means in connection with said current electrodes and said scanning means, in connection with said transmission means and said indicating means for scaling the indicated potential signal in response to the magnitude of said potential field.

8. A well formation resistivity logging system having means including current electrodes for producing a potential field at variable depths within a well bore, a plurality of potential electrodes fixedly disposed in spaced relation within said potential field and indicating means for separately indicating a potential signal in relation to the well depth at which said potential field is disposed, comprising; an interpolation potentiometer adapted for continuous scanning cycles and provided of incremental resistivity related to a preselected interpolation function in connection with said potential electrodes for sequentially detecting the potentials occurring at each potential electrode spacing and interpolating the potentials occurring intermediate each spacing in response to said detected potentials and in relation to said interpolation function to exhibit a continuous potential signal through each of said scanning cycles; signal transmission means in connection with said interpolation poteniometer for transmitting said potential signal to said indicating means; and a synchronized scaling means, including switching means in connection with said current electrodes and said scanning means, in connection with said transmission means and said indicating means for scaling the indicated potential signal in response to the magnitude of said potential field.

9. In a well formation resistivity logging system having means including current electrodes for producing a potential field at variable depths within a well bore and a plurality of potential electrodes fixedly disposed in spaced relation within said potential field, the combination comprising; interpolation means adapted for continuous scanning cycles disposed near and in connection with said potential electrodes for sequentially detecting the potentials occurring at every potential electrode during each scanning cycle and for continuously interpolating the potentials occurring intermediate every potential electrode spacing in response to the potentials occurring at adjacent potential electrodes and according to a preselected function to exhibit a continuous potential signal through each scanning cycle; a scanning means in driving connection with said interpolation means for selectively sweeping said interpolation means through a complete continuous scanning cycle; signal transmission means in connection with said interpolation means for transmitting each continuous potential signal to the earth's surface; and means in connection with said transmission means for indicating each said potential signal in relation to the well formation depth at which said signal was detected.

References Cited in the file of this patent

UNITED STATES PATENTS

| | | |
|---|---|---|
| 2,654,064 | Broding | Sept. 29, 1953 |
| 2,754,475 | Norelius | July 10, 1956 |
| 2,782,364 | Schuler | Feb. 19, 1957 |